US010257705B2

(12) United States Patent
Bradley et al.

(10) Patent No.: US 10,257,705 B2
(45) Date of Patent: Apr. 9, 2019

(54) CONFIGURING WIRELESS ACCESSORY DEVICES

(71) Applicant: Apple Inc., Cupertino, CA (US)

(72) Inventors: Bob Bradley, San Jose, CA (US); Andrew W. Burks, Sunnyvale, CA (US); Gregg J. Golembeski, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 14/288,616

(22) Filed: May 28, 2014

(65) Prior Publication Data

US 2014/0366105 A1    Dec. 11, 2014

Related U.S. Application Data

(60) Provisional application No. 61/833,382, filed on Jun. 10, 2013.

(51) Int. Cl.
*H04W 12/06* (2009.01)
*H04W 12/08* (2009.01)
(Continued)

(52) U.S. Cl.
CPC ......... *H04W 12/08* (2013.01); *H04L 41/0806* (2013.01); *H04L 63/083* (2013.01);
(Continued)

(58) Field of Classification Search
CPC .................................................... H04W 12/08
(Continued)

(56) References Cited

U.S. PATENT DOCUMENTS 6,598,057 B1 * 7/2003 Synnestvedt ........... H04L 29/06
8,073,972 B2  12/2011 Jansen et al.
(Continued)

FOREIGN PATENT DOCUMENTS

CN       103079257 A       5/2013
WO    WO2010104435        9/2010
WO    WO2013048645        4/2013

OTHER PUBLICATIONS

Samuel Master, "Solved: Wifi connection to router disconnection during Screen Mirroring with Netgear P . . . —Support forum," , May 2, 2013, pp. 1-9.*

(Continued)

*Primary Examiner* — Luu T Pham
*Assistant Examiner* — Canh Le
(74) *Attorney, Agent, or Firm* — Dickinson Wright RLLP (57) ABSTRACT

This document describes, inter alia, techniques for configuring or setting up a wireless device. As an example of the features described herein, a first wireless device may be used to configure a second wireless device as follows: the first wireless device may detect that the second wireless device is available and is configurable; the first wireless device may connect to the second wireless device and transmit configuration information to the second wireless device, where the configuration information includes credentials that may be used to access a wireless network (e.g., a password to access a Wi-Fi network); the first wireless device and the second wireless device may then both connect to the wireless network, using the credentials; once both devices are connected to the wireless network, the first wireless device may verify that the second wireless device has been correctly configured.

18 Claims, 5 Drawing Sheets

(51) Int. Cl.
*H04L 12/24* (2006.01)
*H04L 29/06* (2006.01)
*H04W 8/20* (2009.01)
*H04W 76/14* (2018.01)
*H04W 84/12* (2009.01)

(52) U.S. Cl.
CPC ........... *H04L 63/0853* (2013.01); *H04W 8/20* (2013.01); *H04W 12/06* (2013.01); *H04W 76/14* (2018.02); *H04L 41/082* (2013.01); *H04W 84/12* (2013.01)

(58) Field of Classification Search
USPC .......................................................... 726/5
See application file for complete search history.

(56) References Cited

U.S. PATENT DOCUMENTS

| | | | | |
|---|---|---|---|---|
| 2003/0078072 | A1* | 4/2003 | Serceki | G06F 9/44505 455/557 |
| 2003/0181203 | A1* | 9/2003 | Cheshire | G06Q 30/0267 455/419 |
| 2005/0203912 | A1* | 9/2005 | Beach | H04R 1/1091 709/221 |
| 2005/0273790 | A1 | 12/2005 | Kearney et al. | |
| 2006/0089127 | A1 | 4/2006 | Muratsu | |
| 2006/0282885 | A1* | 12/2006 | Combs | H04W 28/18 726/5 |
| 2009/0168676 | A1 | 7/2009 | Olson | |
| 2010/0015919 | A1 | 1/2010 | Tian | |
| 2010/0180016 | A1 | 7/2010 | Bugwadia et al. | |
| 2010/0211783 | A1* | 8/2010 | Lukaszyk | H04L 51/12 713/168 |
| 2011/0075589 | A1* | 3/2011 | Bradley et al. | 370/254 |
| 2011/0188657 | A1* | 8/2011 | Kweon | H04W 48/16 380/270 |
| 2011/0211219 | A1* | 9/2011 | Bradley | H04W 48/16 358/1.15 |
| 2011/0288807 | A1* | 11/2011 | Iwase | G06F 11/0751 702/117 |
| 2012/0099476 | A1 | 4/2012 | Mahaffy et al. | |
| 2012/0163215 | A1 | 6/2012 | Kim et al. | |
| 2012/0207056 | A1 | 8/2012 | Ree et al. | |
| 2012/0284517 | A1* | 11/2012 | Lambert | H04L 63/0823 713/169 |
| 2012/0315853 | A1* | 12/2012 | Lambert | H04W 8/005 455/41.2 |
| 2013/0014232 | A1 | 1/2013 | Louboutin et al. | |
| 2013/0097329 | A1* | 4/2013 | Alex | H04L 61/1511 709/228 |
| 2013/0100487 | A1* | 4/2013 | Busch | G06F 3/1206 358/1.15 |
| 2013/0217359 | A1* | 8/2013 | Cherian | G06F 15/177 455/411 |
| 2013/0223279 | A1* | 8/2013 | Tinnakornsrisuphap | H04L 41/0809 370/254 |
| 2014/0007196 | A1* | 1/2014 | Lin | G06F 21/31 726/4 |
| 2014/0134947 | A1 | 5/2014 | Stouder-Studenmund | |
| 2014/0143384 | A1* | 5/2014 | Wong | H04L 67/34 709/219 |
| 2014/0157298 | A1* | 6/2014 | Murphy | H04N 21/64322 725/14 |
| 2014/0204803 | A1* | 7/2014 | Nguyen | H04L 41/5054 370/255 |
| 2014/0222688 | A1 | 8/2014 | Haggerty et al. | |
| 2014/0269646 | A1* | 9/2014 | Ramasamy | H04W 76/14 370/338 |

OTHER PUBLICATIONS

Se Gi Hong et al., "Accelerating Service Discovery in Ad-hoc Zero Configuring Networking," IEEE, 2007, pp. 961-965.*
Sumi Helal et al., "Konark—A Service Discovery and Delivery Protocol for Ad-Hoc Networks," IEEE, 2003, pp. 2107-2113.*
PCT Application No. PCT/US2014/039701—International Search Report and Written Opinion dated Sep. 24, 2014.
Taiwanese Patent Application No. 103118683—Office Action dated Jul. 27, 2016.
Wi-Fi Simple Configuration Protocol and Usability Best Practices for the Wi-Fi Protected Setup™ Program; Version 2.0.1; Wi-Fi Alliance; Apr. 2011; 30 pgs.
European Patent Application No. 14811686.6—Search Report dated Dec. 20, 2016.
Taiwanese Patent Application No. 103118683—Office Action dated Aug. 21, 2015.
Taiwanese Patent Application. No. 106113229—Office Action and Search Report dated Aug. 30, 2018.
European Patent Application No. 14811686.6—Examination Report dated Jan. 11, 2018.
Chinese Patent Application No. 201480032829.8—First Office Action issued dated Feb. 26, 2018.

* cited by examiner

CONFIGURING WIRELESS ACCESSORY DEVICES

CROSS-REFERENCE TO RELATED APPLICATIONS

This application claims the benefit of U.S. Provisional Application No. 61/833,382, filed Jun. 10, 2013 and entitled "CONFIGURING WIRELESS ACCESSORY DEVICES," and which is incorporated by reference herein in its entirety for all purposes.

FIELD

The described embodiments generally relate to wireless networking technology, and more particularly, to methods and apparatus to configure wireless accessory devices.

BACKGROUND

Many wireless devices require a configuration in order to access a wireless network. For example, when a user wishes to use a wireless device (such as a wireless speaker) on a Wi-Fi network for the first time, the user may be required to provide a password in order for the device to connect to the Wi-Fi network. A number of different approaches have been developed to address how wireless devices are configured; despite the considerable efforts spent in designing and implementing these approaches, further improvements in this area (and related areas) are desired.

SUMMARY

This document describes, inter alia, techniques for configuring a wireless device.

As an example of the features described herein, a first wireless device may be used to configure a second wireless device as follows: the first wireless device may detect that the second wireless device is available and is configurable; the first wireless device may connect to the second wireless device and transmit configuration information to the second wireless device, where the configuration information includes credentials that may be used to access a wireless network (e.g., a password to access a Wi-Fi network, where the password may have been provided to the first wireless device via input from a user); the first wireless device and the second wireless device may both connect to the wireless network, using the credentials; once both devices are connected to the wireless network, the first wireless device may verify that the second wireless device has been correctly configured.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples of dynamically selecting antenna tuner settings in a mobile wireless communication device based on a combination of downlink operating conditions, uplink operating conditions, or both is provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

Throughout this document, terms such as "may," "may include," "in an instance," "in some instances," "in some implementations," "can," and related/similar terms will be used; these terms should be understood to indicate that, while details of an element are present in at least one embodiment, other embodiments may differ in the details of one or more elements. In other words, when it is described in this document that an element "may" be present or that an action "may" be performed (or that an element is present "in an instance" or that an action is performed "in an instance," and so on), it should be understood that the element is present or that the action is performed in at least one embodiment, but not necessarily in all embodiments.

Throughout this document, reference will be made to some features that are specific to Wi-Fi (i.e., IEEE 802.11 wireless technology); this is done for ease of description, and it should be understood that the features described herein may be used, mutatis mutandis, in the context of any wireless technology.

Figure 1:
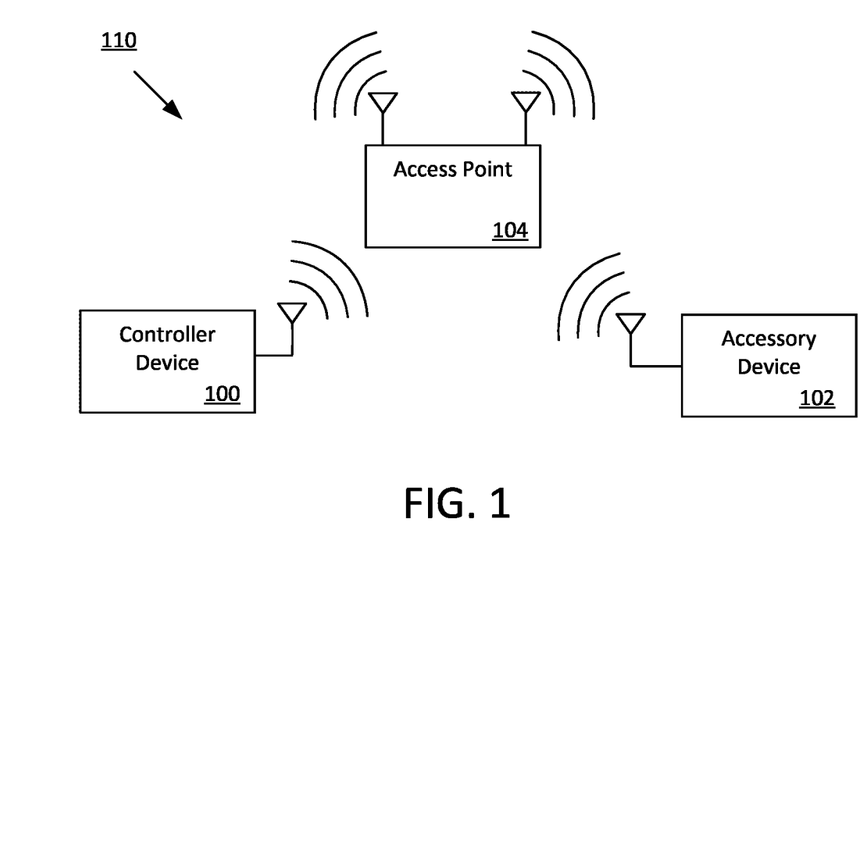
FIG. 1 shows an example network architecture where features described herein may be implemented in accordance with some embodiments.

FIG. 1—Example Network Architecture

FIG. 1 shows an example network architecture 110 wherein features described herein may be implemented. The network architecture 110 includes a controller device 100, an accessory device 102, and an access point 104.

The controller device 100 may be, for example, a desktop or laptop computer, a smartphone, a tablet computer, or any other type of wireless device.

The accessory device 102 may be, for example, a device such as: a speaker; a docking station; a printer; a mouse; a keyboard; a headset (i.e., headphone combined with a microphone); a track pad; a joystick; a headphone; a scanner; a media player; a display device; a thermostat controller; a garage door opener; an automobile or other vehicle; a refrigerator or other type of home appliance; and/or any other type of wireless device. The accessory device 102 may also be referred to as a peripheral device. The accessory device 102 may be configured to operate in a number of different ways, and the configuration of the accessory device 102 may be determined by settings for parameters. For example, the accessory device 102 may have a configurable name that can be set (that may be used, among other circumstances, when the accessory device 102 broadcasts that it is available to connect to), have an administrative password that may be set to control access to configuration parameters, and/or other parameters that the accessory device 102 uses when operating. The accessory device 102 may store information regarding services that it implements, including a configuration service whereby the accessory device 102 device may establish a wireless connection to another device (such as the controller device 100) in order for the accessory device 102 to be configured.

The controller device 100 may include components including but not limited to a processor (which may run/execute an operating system and applications for the controller device 100, and/or perform other functionality), a memory device and/or data storage device (which may be coupled to the processor and which may store the operating system, applications, and related data), a wireless interface (for communicating wirelessly with the accessory device 102 and/or the access point 104, using Wi-Fi and/or other wireless technologies), and/or one or more antennas. The controller device 100 may also include and/or be connected to a display device (e.g., a Liquid Crystal Display (LCD) or Light-Emitting Diode (LED) display, or other type of display device).

The accessory device 102 may include components such as those described above as included and/or connected to the controller device 100. Alternatively or additionally, in some instances, the accessory device 102 may include an authentication coprocessor, and/or other components. Further, in some instances (e.g., when the accessory device 102 is a device such as a speaker, thermostat, or other type of device), the accessory device 102 may not include a user interface, or include a limited user interface.

The access point 104 is a wireless device that, among other functionality, may act as a central connection point for IEEE 802.11 infrastructure mode operation, providing a Wi-Fi network to which other wireless devices (such as the controller device 100 and/or the accessory device 102) may connect. The access point 104 may also include components such as those described above as included and/or connected to the controller device 100.

The controller device 100, the accessory device 102, and the access point 104 may communicate in a number of different ways. As one example, the controller device 100 and the accessory device 102 may both associate with the access point 104, and then data may be communicated between the controller device 100 and the accessory device 102 via the access point 104. Alternatively or additionally, the controller device 100 and the accessory device 102 may communicate directly with each other; this may be performed using technology such as but not limited to IEEE 802.11 ad hoc mode technology, Wi-Fi Direct Technology, Apple Wireless Direct Link (AWDL) technology, and/or any other appropriate technology, and/or the accessory device 102 may be configurable to act as an access point (i.e., act as a central connection point for IEEE 802.11 infrastructure mode operation), and the controller device 100 may act as a client station (STA) and connect to the accessory device 102.

In some instances, the access point 104 may implement a security/authentication framework, such as Wi-Fi Protected Access II (WPA2), WPA, and/or other security/authentication frameworks. In such an instance, in order to successfully connect to the wireless network provided by the access point 104, wireless devices that want to connect to the wireless network must provide security/authentication credentials, such as a password.

The controller device 100 may implement one or more service discovery protocols. One such protocol that may be implemented by the controller device 100 is Bonjour, which is based on technologies such as Domain Name System (DNS), Multicast Domain Name System (mDNS), and Domain Name System-Service Discovery (DNS-SD). In order to discover services using Bonjour, the controller device 100 may exchange DNS-SD/mDNS messages (on multicast address 224.0.0.251:5353 for IPv4 or on multicast address [FF02::FB]:5353 for IPv6) with other devices.

The accessory device 102 may, similarly, also implement Bonjour and/or other service discovery protocols. As mentioned above, the accessory device 102 may implement a configuration service; in some instances, the accessory device 102 may use a service discovery protocol (such as Bonjour) to advertise information regarding its configuration service.

The accessory device 102 may store information about its configuration service in a number of different ways. In an instance where the accessory device 102 implements Bonjour (or a similar protocol), the accessory device 102 may store information such as the following:

(a) the accessory device 102 may store a DNS Service (SRV) resource record, which may be named according to a <Instance Name>.<Service Type>.<Domain> format (e.g., "AccessoryOne._mfi-config._tcp.local," and/or which may include information such as the hostname for the accessory device 102 and a port at which the configuration service offered by the accessory device 102 is implemented; and (b) the accessory device 102 may store a DNS Pointer (PTR) resource record, which may be named according to a <Service Type>.<Domain> format (e.g., "_mfi-.config._tcp," and which may point to the DNS SRV resource record mentioned above (i.e., the RDATA field in the PTR resource record may include the value "AccessoryOne._mfi-config._tcp.local"); and (c) the accessory device 102 may store a DNS Text (TXT) resource record, which may have the same name as the DNS SRV resource record mentioned above, and which may include information such as but not limited to: a "deviceid" field, which may include a globally unique identifier for the accessory device 102, and which may (in some instances) be the primary Media Access Control (MAC) address for the accessory device 102; a "features" field that indicates one or more of whether there is an application associated with the accessory device 102, whether the accessory device 102 supports an accessory configuration protocol over Wi-Fi, and whether the accessory device 102 supports type-length-value (TLV) based configuration; a "flags" field that indicates one or more of whether a problem with the accessory device 102 has been detected and whether the accessory device 102 has been configured; a "pro-tovers" field that indicates the version of the configuration service that the accessory device 102 supports (formatted in a <major>.<minor> (e.g. "1.0") format); and a "seed" field that indicates a configuration seed number (which can be characterized as a "configuration counter," and which is updated by the accessory device 102 each time the configuration in the accessory device 102 is changed).

The accessory device 102 may also implement a Hypertext Transfer Protocol (HTTP) server. In such an instance, when the HTTP server is running on the accessory device 102, the controller device 100 and the accessory device 102 may communicate using HTTP messages (e.g., HTTP POST message, HTTP GET messages, and so on), with the controller device 100 acting as the HTTP client.

Although the controller device 100 is referred to herein as a "controller" and though the accessory device 102 is referred to as an "accessory," these terms are used only for ease of description and should not be understood to be limiting; the features described herein as performed by the controller device 100 and/or the accessory device 102 may be performed by any type of wireless device.

Figure 2:
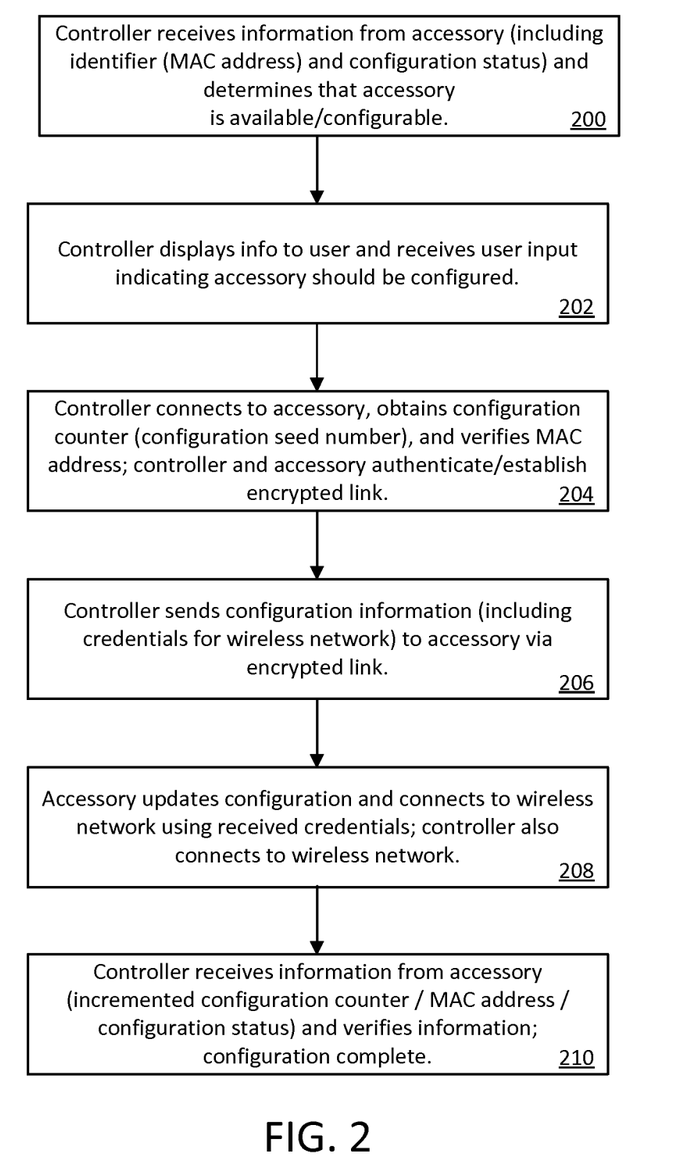
FIG. 2 shows an example method for configuring a wireless device in accordance with some embodiments.

FIG. 2—Example Method for Configuring Accessory Device

FIG. 2 shows an example method that may be performed to configure some attributes and/or aspects of the operation of the accessory device 102.

As the method of FIG. 2 begins, the controller device 100 may be connected to (or may have connected to in the past) a wireless network provided by the access point 104. The controller device 100 may store information regarding the wireless network, such as credentials (e.g., a password) for accessing the wireless network, information that identifies the wireless network (such as a Service Set Identifier (SSID) for the wireless network), and/or other information.

At block 200, the controller device 100 may receive information from the accessory device 102 and determine that the accessory device 102 is available to be configured. As one example of how this may be performed, the accessory device 102 may act as an access point and may transmit beacon messages (or other messages) that include information that, when processed by the controller device 100, indicate to the controller device 100 that the accessory device 102 is available for configuration. The beacon messages (or other messages) may include information such as a device identifier (e.g., a MAC address, or other type of unique identifier) for the accessory device 102.

At block 202, the controller device 100 may display information in a graphical user interface, indicating that the accessory device 102 is available for configuration. The controller device 100 may receive user input from a user of the controller device 100, indicating that the accessory device 102 should be configured. The controller device 100 may also receive user input that indicates configuration parameters for the accessory device 102, such as a name for the accessory device 102, an administrative password for the accessory device 102, and so on.

At block 204, the controller device 100 may establish a connection to the accessory device 102. In an instance where the accessory device 102 acts as an access point, this may include the controller device 100 joining the wireless network provided by the accessory device 102. Once connected to the accessory device 102, the controller device 100 may receive information from the accessory device 102, such as a configuration counter (a "configuration seed" number) and a device identifier. The controller device 100 may verify that the device identifier (which may be, for example, a MAC address) is the same as the device identifier received at block 200. If the controller device 100 determines that the device identifier is the same, the controller device 100 may then initiate an authentication procedure with the accessory device 102, to establish an encrypted link to the accessory device 102.

At block 206, the controller device 100 may transmit configuration information to the accessory device 102 via the encrypted link. The configuration information may include information regarding the wireless network provided by the access point 104 (such as credentials (e.g., a password) and an identifier for the network), and/or other information received via user input at block 202.

At block 208, the accessory device 102 may update its configuration using the configuration information received at block 206. Additionally, the controller device 100 and the accessory device 102 may both move to the wireless network provided by the access point 104, using the above-mentioned credentials that were transmitted to the accessory device 102 at block 206. This may also include the accessory device 102 updating its configuration counter/configuration seed number (by incrementing it and/or otherwise changing its value), and/or the accessory device 102 updating stored configuration status information to reflect that the accessory device 102 has been configured.

At block 210, both the accessory device 102 and the controller device 100 may be connected to the wireless network provided by the access point 104, and the accessory device 102 may transmit information to the controller device 100 via the wireless network provided by the access point 104. The information may include the incremented/changed configuration counter/configuration seed number, the MAC address for the accessory device 102, and configuration status information for the accessory device 102. The controller device 100 may verify the received information, which may include determining whether the value for the configuration counter/configuration seed number has been incremented/changed (versus its value as received at block 204), determining whether the device identifier is the same as received previously (at block 204 and block 200), and determining that the configuration status information indicates that the accessory device 102 has been configured. If the controller device 100 verifies that the configuration counter has been incremented/changed, that the device identifier is the same as had been received previously, and that the configuration status information indicates that the accessory device 102 has been configured, then the controller device 100 may determine that configuration of the accessory device 102 has been successful. Then, the accessory device 102 may communicate data on the wireless network provided by the access point 104, to/from the controller device 100 and/or other devices that may be connected to the wireless network.

Figure 3A:
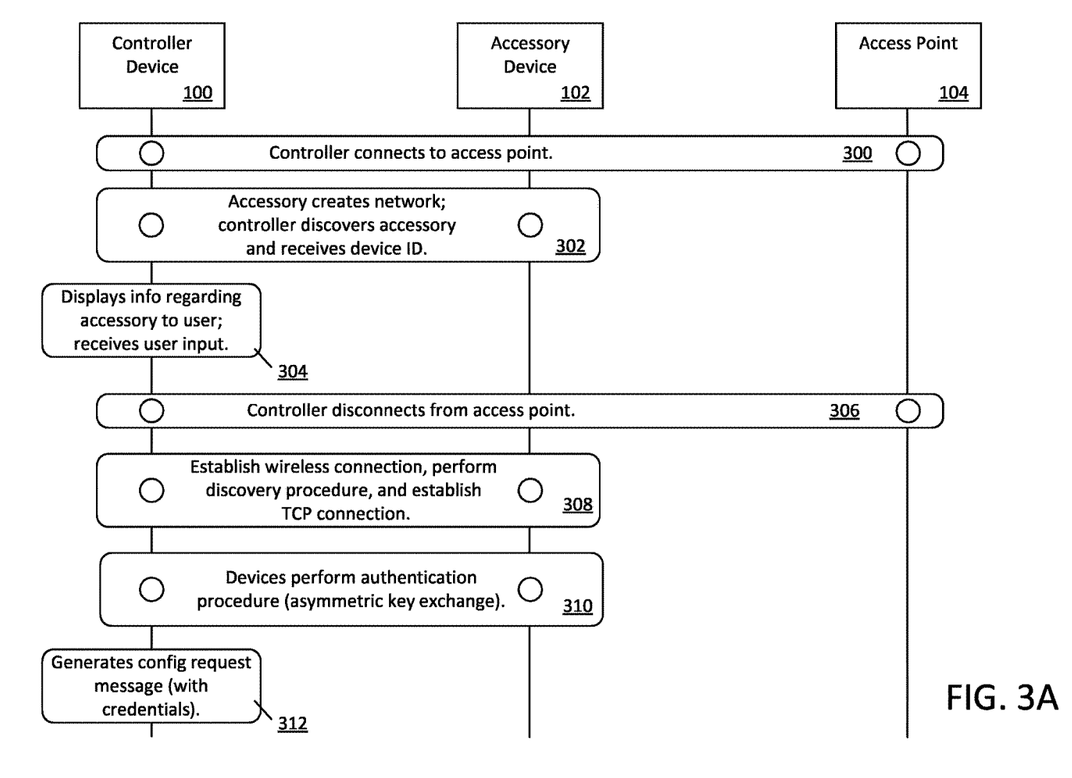
FIG. 3A and FIG. 3B show a more specific implementation of the method of FIG. 2 in accordance with some embodiments.
Figure 3B:
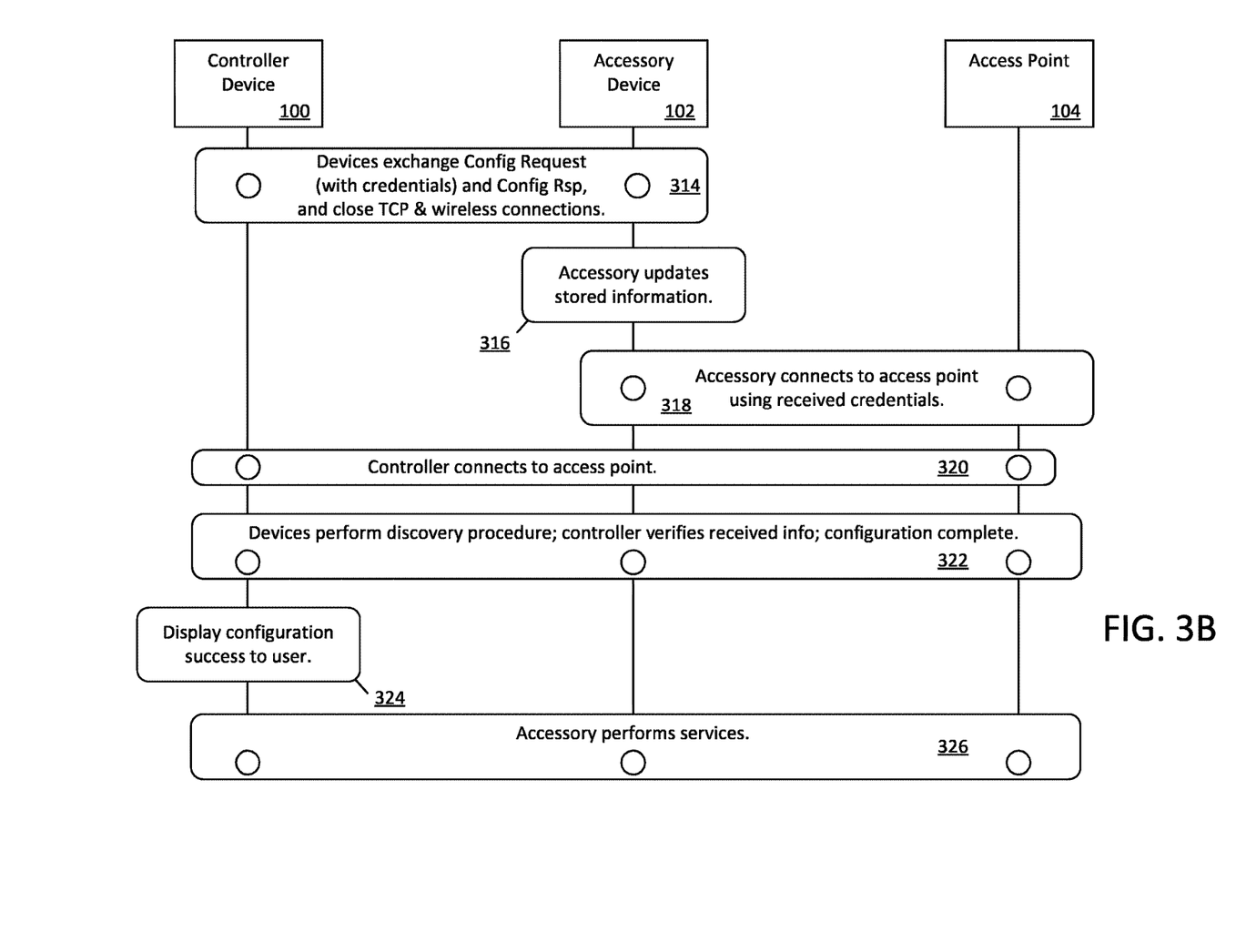

FIG. 3A/FIG. 3B—Method for Configuring Accessory Device

FIG. 3A/FIG. 3B show a method that may be viewed as a more specific version of the above-described method of FIG. 2. In the following description, it will be described that the controller device 100 and the accessory device 102 implement Bonjour; however, this is done for ease of description, and it should be understood that, in different implementations, any other appropriate service discovery protocol(s) may be used.

As shown in FIG. 3A, at block 300, the controller device 100 may connect to the access point 104. This may include, for the example, the controller device 100 and the access point 104 performing a Wi-Fi association procedure, and/or may include an authentication procedure to authenticate the controller device 100, using e.g., WPA2 authentication. Block 300 may include the controller device 100 receiving a password via user input from a user of the controller device 100, and may include the controller device 100 transmitting the password to the access point 104 as part of the authentication procedure. The controller device 100 may store information regarding the access point 104, including but not limited to the SSID for the access point 104, the password used to connect to the access point, and/or other information.

At block 302, the accessory device 102 may be configured to act as an access point (or a "soft access point"), and/or to otherwise implement IEEE 802.11 infrastructure mode access point functionality (or some subset thereof). This may include the accessory device 102 providing a Wi-Fi network, and periodically transmitting beacon messages to advertise its Wi-Fi network. A beacon message transmitted by the accessory device 102 may include one or more Information Element (IEs) that indicate information such as the following: a name (or "friendly name") for the accessory device 102; a name of the manufacturer of the accessory device 102 (e.g., "Apple Inc."); a name of the model of the accessory device 102 (e.g., "Speaker System 9000"); an Organizationally Unique Identifier (OUI) for accessory device 102; a device identifier (or "Device ID"), which may be the MAC address of the accessory device 102; whether the accessory device 102 supports AirPlay (and/or similar technologies); whether the accessory device 102 is configured or "not configured"; whether the accessory device 102 supports one or more configuration protocols (such as Made For iPhone/iPod/iPad (MFi) Configuration v1 and/or Association Control Protocol (ACP) Configuration v1); and/or other information regarding the accessory device 102. The above-mentioned information may be included in one or more vendor-specific IEs in the beacon messages and/or in other IEs in the beacon messages broadcast by the accessory device 102.

The controller device 100 may receive one or more beacon messages transmitted by the accessory device 102, and/or otherwise discover the accessory device 102. The controller device 100 may store the information indicated in the beacon message(s), including the device identifier (which may be a MAC address) for the accessory device 102, and the other information mentioned above. Based on the information included in the beacon message(s) (in particular, the information indicating whether the accessory device 102 is configured/"not configured" and/or the information indicating whether the accessory device 102 implements one or more configuration protocols, such as MFi Configuration v1), the controller device 100 may determine that the accessory device 102 is in a state where it is configurable and/or that the controller device 100 should attempt to configure the accessory device 102.

At block 304, in response to the determination that the accessory device 102 is in a state where it is configurable and/or that the controller device 100 should attempt to configure the accessory device 102, the controller device 100 may display information regarding the accessory device 102 on a graphical user interface, e.g., on a display of the controller device 100. The information may indicate, e.g., the name of the accessory device 102, whether the accessory device 102 is currently configurable and/or has been discovered, the SSID for the accessory device 102, and/or other information about the accessory device 102. The controller device 100 may receive user input that is responsive to the displayed information and that indicates that action should be taken to configure the accessory device 102.

At block 306, in response to the user input that indicates that action should be taken to configure the accessory device 102, the controller device 100 may disconnect from the access point 104. This may include the controller device 100 performing a disassociation procedure with the access point 104, and/or otherwise disconnecting from the access point. As mentioned previously, the controller device 100 may store information regarding the access point, such as the password that was used to connect to the access point 104 and the SSID being used by the access point; here, even though the controller device 100 is disconnecting from the access point 104, the controller device 100 may continue to store the above-mentioned information regarding the access point 104.

At block 308, the controller device 100 and the accessory device 102 may establish a wireless connection (i.e. the controller device 100 may perform a Wi-Fi association process to associate to the accessory device 102), to establish physical layer and data link layer connectivity between the controller device 100 and the accessory device 102.

Following establishment of the wireless connection, the controller device 100 and the accessory device 102 may perform a Bonjour service discovery procedure, in order for the controller device 100 to connect to the configuration service implemented by the accessory device 102. This may include the controller device 100 and the accessory device 102 exchanging one or more DNS-SD/mDNS messages. Alternatively or additionally, this may be performed as follows:

(a) the controller device 100 may transmit a DNS-SD/mDNS query message (with a query type of PTR) requesting information regarding the configuration service implemented by the accessory device 102; in an example where the service is an MFi configuration service, the Query Domain Name (QNAME) field in the Question Entry field in the DNS-SD/mDNS query message may include text such as "_mfi-config._tcp" or "_airplay._tcp";

(b) in response to the query message, the accessory device 102 may transmit a DNS-SD/mDNS query response message with information that points to a SRV resources record that describe services implemented by the accessory device 102 that match the service queried for in the initial query message; in an example where the accessory device 102 has the name "AccessoryA" and supports MFi configuration, the query response message may be of type PTR and may include an RDATA field that includes text such as "AccessoryA._mfi-config._tcp.local," thereby pointing to the SRV resource record named "AccessoryA._mfi-config._tcp.local" stored by the accessory device 102;

(c) in response to the query response message, the accessory device 102 may transmit one or more additional DNS-SD/mDNS query messages to obtain the SRV resource record mentioned above and/or the DNS TXT resource record that associated with the SRV resource record;

(d) in response to the one or more query messages from (c), the accessory device 102 may transmit DNS-SD/mDNS response messages that include the queried-for SRV and TXT resource records; the SRV resource record may include information such as the hostname of the accessory device 102 and the port at which the configuration service implemented by the accessory device 102 can be reached; and the TXT resource record may include information such as the device ID for the accessory device 102 (e.g., the MAC address for the accessory device 102), the configuration seed number, and/or any of the other types of information mentioned above in the description of FIG. 1 as stored by the accessory device 102 in the DNS TXT resource record.

The controller device 100 may check to verify that the device identifier (MAC address) received in the TXT resource record is the same as the device identifier (MAC address) received in the beacon in block 302. Additionally, the controller device 100 may store the information received in the DNS SRV and TXT resource records, including but not limited to the device ID (MAC address), hostname, port, and configuration seed number.

Upon completing the Bonjour service discovery procedure, the controller device 100 may use DNS to resolve the Internet Protocol (IP) address for the accessory device 102, using the hostname received in the SRV resource record. Following this, the controller device 100 may then establish a Transmission Control Protocol (TCP) connection to the accessory device 102, using the resolved IP address and the port as specified in the received SRV resource record. Establishing the TCP connection may include the controller device 100 and the accessory device 102 performing a TCP handshake procedure (i.e., communicating Synchronize (SYN)/Synchronize-Acknowledge (SYN-ACK)/Acknowledge (ACK) messages, and so on).

At block 310, the controller device 100 and the accessory device 102 may perform an authentication and/or encryption establishment procedure (using the TCP connection established at block 308), to establish secure/encrypted communications between them. The authentication/encryption establishment procedure may involve an asymmetric key exchange, and/or be based on other mechanisms. Alternatively or additionally, the authentication/encryption establishment procedure may be performed according to the MFi Secure Authentication Protocol (MFI-SAP), and/or any other appropriate protocol. In an instance where the accessory device 102 includes an authentication co-processor, the authentication co-processor may be used during the procedure. Subsequent communications between the controller device 100 and the accessory device 102 (i.e., communications performed, in block 312 and beyond, in the remaining portions of FIG. 3A/FIG. 3B) may be performed using the encryption scheme established at block 310.

At block 312, the controller device 100 may generate a configuration request message for transmission to the accessory device 102. The configuration request message may include information such as the following: an "adminPassword" field, which includes an administrative password used to change settings on the accessory device 102; a "firmwareRevision" field, which indicates a firmware revision of the accessory device 102; a "hardwareRevision" field, which indicates a hardware revision of the accessory device 102; a "language" field, which indicates a BCP-47 language to configure the device for; a "manufacturer" field, which indicates a manufacturer of the accessory device 102 (e.g., "Apple Inc."); one or more "mfiProtocol" fields, each of which includes a reverse-DNS string describing supported MFi accessory protocols (e.g. "com.acme.gadget"); a "model" field that indicates a model name of the device; a "name" field that indicates the name (or "friendly" name) that the accessory device 102 should use to advertise itself to users; a "playPassword" field that indicates a password used to obtain access to perform AirPlay media streaming to the accessory device 102; a "serialNumber" field that indicates a serial number of the accessory device 102; a "wifiPSK" field that includes the password required to connect to the access point 104, which if between 8 and 63 bytes long may be a pre-hashed password or if a different size (i.e., not between 8 and 63 bytes long) may be a pre-hashed, 256-bit pre-shared key; and a "wifiSSID" field, which indicates the SSID being used by the access point 104. (As mentioned above, the password and the SSID for the access point 104 may have been stored by the controller device 100 upon connecting to the access point 104 at block 300.)

At block 314, the controller device 100 may transmit the generated configuration request message to the accessory device 102. Upon receiving the configuration request message, the accessory device 102 may validate the configuration request message, and may store the information described above as included in the configuration request message. Then, the accessory device 102 may generate a configuration response message, and transmit the configuration response message to the controller device 100. The configuration response message may include information such as whether there is an application associated with the accessory device 102, a uniform resource locator (URL) or other identifier of a web resource/location to obtain the associated application, and/or other information. As mentioned above, the communication that takes place here (i.e., the communication of the configuration request/response) may take place using the encryption mechanism established at block 312.

Then, the controller device 100 and accessory device 102 may close their TCP connection. This may include the controller device 100 transmitting a TCP message to the accessory device 102, where the finish (FIN) flag of the message is set; upon receiving this TCP message, the accessory device 102 determines that the controller device 100 has closed the connection. Similarly, this may include the accessory device 102 transmitting a TCP message to the controller device 100, where the FIN flag is set; upon receiving this message, the controller device 100 determines that the accessory device 102 has closed the connection.

Following closing of the TCP connection, the controller device 100 and accessory device 102 may close their wireless connection. This may include the controller device 100 performing a disassociation procedure from the accessory device 102, and/or otherwise disconnecting from the Wi-Fi network provided by the accessory device 102.

At block 316, in response to the closing of the TCP connection and/or wireless connection, the accessory device 102 may update its configuration and/or other information that it is storing. This may include, for example, de-registering its Bonjour service, incrementing (and/or otherwise changing) the configuration seed value stored in its TXT resource record, and/or updating the "flags" field stored in its TXT resource record to indicate that the accessory device 102 has been configured. Alternatively or additionally, this may include the accessory device 102 updating other information that was received in the configuration request message—for example, if the configuration request message including a new name and/or administrative password, the accessory device 102 may update its configuration data accordingly.

Next, at block 318, the accessory device 102 searches for and connects to the access point 104. To search for the access point 104, the accessory device 102 may perform active scanning (i.e., transmitting Probe Request messages on different Wi-Fi channels, each of the Probe Requests with the SSID of the access point 104 as received in the configuration request message received from the controller device 100 at block 314, and receiving a responsive Probe Response message from the access point 104), and/or may perform passive scanning (i.e., may listen for beacons on different Wi-Fi channels); in either case, the accessory device 102 may compare the SSIDs in the received Probe Response messages and/or beacons against the SSID received in the configuration request message from block 314, to determine whether the access point 104 has been found/discovered. Once the accessory device 102 has found/discovered the access point 104, the accessory device 102 and the access point 104 may perform a Wi-Fi association procedure (which may be initiated by the accessory device 102 using information received in the above-mentioned Probe Response and/or beacon messages). Additionally, the accessory device 102 and the access point 104 may perform an authentication procedure to authenticate the accessory device 102, e.g., using WPA2 authentication. For the authentication procedure, the accessory device 102 may use the password (or a version thereof) received in the configuration request message from block 314 (i.e., the accessory device 102 may transmit the password to the access point 104 in one or more messages as part of the authentication procedure).

After the peripheral connects to the access point 104, it updates its DNS resource records (e.g., updates the hostname in the SRV resource record, if necessary) to reflect any new state/status information that results from being connected to the Wi-Fi network provided by the access point 104. In the updated DNS records, the configuration seed value in the TXT resource record may be incremented (or otherwise changed) and the "flags" field in the TXT resource record may be adjusted to indicate that the accessory device 102 has been configured.

At block 320, the controller device 100 may connect to the access point 104. This may include, for the example, the controller device 100 and the access point 104 performing a Wi-Fi association procedure, and may include the accessory device 102 authenticating to the access point 104 using the password stored at the accessory device 102 (which is the same password, as mentioned above, as used by the accessory device 102 at block 318).

At block 322, the controller device 100 and the accessory device 102 may perform a Bonjour service discovery procedure via the Wi-Fi network provided by the access point 104. This procedure may proceed in a similar/analogous fashion as that described above with respect to block 308; in other words, similar/analogous messages may be exchanged (as described above with respect to block 308), with updated values, as appropriate. As part of this procedure, the controller device 100 may receive the TXT resource record (in an DNS-SD/mDNS message) from the accessory device 102, with the updated configuration seed and "flags" fields.

The controller device 100 may then verify the information received from the accessory device 102 during the Bonjour service discovery procedure. This may include one or more of the following:

(a) the controller device 100 may compare the stored configuration seed number received during the first Bonjour discovery procedure (at block 308) against the updated configuration seed number; if the updated value is not different from the configuration seed number from the first Bonjour discovery procedure (i.e., if the accessory device 102 has not incremented/changed the seed number), the controller device 100 may determine that the configuration procedure is unsuccessful, and/or may terminate the method of FIG. 3A/FIG. 3B;

(b) the controller device 100 may analyze the "flags" field in the TXT resource record; if the updated "flags" field indicates that the accessory device 102 has not been configured, the controller device 100 may terminate the method of FIG. 3A/FIG. 3B; and (c) the controller device 100 may analyze the device ID (MAC address) received in the TXT resource record; if the device ID (MAC address) received in the TXT resource record at block 322 does not match the stored device ID (MAC address) from earlier, then the controller device 100 may terminate the method of FIG. 3A/FIG. 3B.

Also at block 322, the controller device 100 may receive information about services (such as audio streaming services, and so on) that the accessory device 102 implements, in other SRV and/or TXT resource records that it receives from the accessory device 102. The information may include, e.g., ports to connect to for the services and/or other configuration information related to initiating the services and/or communicating according to the services.

Then, when the controller device 100 successfully verifies the information received at block 300, the controller device 100 sends a configuration complete message to the accessory device 102.

At block 324, the controller device 100 may display information in the user interface of the controller device 100, indicating that the accessory device 102 has successfully been configured. In an instance where the controller device 100 has received information (in, for example, block 314) indicating that there is an application that is associated with the accessory device, the controller device 100 may display information that, e.g., prompts the user of the controller device 100 to download the associated application.

At block 326, the accessory device 102 may perform services. This may be done, for example, using service-related information received by the controller device 100 at block 322. For example: the accessory device 102 may be a speaker and may implement an audio streaming service (such as AirPlay, a service based on Remote Audio Output Protocol (RAOP), and/or any other audio streaming service); in this example, the controller device 100 may have received information regarding the service (hostname for the accessory device 102, port to connect to for the service, and so on) during the Bonjour discovery procedure at block 322; further to this example, at block 326, the controller device 100 may connect to accessory device 102 using the received information, and then may stream audio data to the accessory device 102; the accessory device 102 may receive the streamed audio data and generate corresponding audible sound waves.

Additionally, once the accessory device 102 has been successfully configured as shown in FIG. 3A/FIG. 3B, other wireless devices (not shown in FIG. 3A/FIG. 3B or FIG. 1) that are connected to the Wi-Fi network provided by the access point 104 may discover the accessory device 102, and the accessory device 102 may provide services to those other wireless devices.

The above-mentioned configuration request, configuration response, and configuration complete messages (from blocks 312, 314, 316, and 322) may be communicated between the controller device 100 and the accessory device 102 in a number of different ways. As one example, the accessory device 102 may run an HTTP server program and the controller device 100 may run an HTTP client program, and these messages may be transmitted within HTTP messages (e.g., the configuration request and configuration complete messages may be and/or be included in HTTP POST messages, and the configuration response may be and/or be included in an HTTP response message, and so on). Alternatively or additionally, one or any combination of these messages may be formatted using a Type/Length/Value (TLV) format.

As a variation on the features described above, instead of the accessory device 102 acting as a wireless access point as described above at block 302, the controller device 100 and the accessory device 102 may communicate at block 302 using a technology such as Wi-Fi Direct, AWDL, or some other peer-to-peer or similar wireless technology. In such an instance, instead of the controller device 100 receiving a beacon that include the information mentioned above with respect to block 302, the controller device 100 may receive similar/analogous information in other messages (e.g., Generic Advertisement Service (GAS) messages) received from the accessory device 102; in such an instance, the controller device 100 may determine that the accessory device 102 is in a state where it is configurable and/or that the controller device 100 should attempt to configure the accessory device 102 in response to the information received in these other messages.

Although FIG. 3A/FIG. 3B show distinct blocks, this is done for ease of description, to convey the different types of actions that the controller device 100, accessory device 102, and access point 104 may perform with respect to each other; the blocks of the method of FIG. 3A/FIG. 3B may, in various implementations, be performed in any order (including concurrently), and/or in any particular combination, as appropriate. Further, each or any of the actions described above as taking place as part of a particular block may be temporally interleaved with each or any of the actions described above as being included as part of a different block. As just one example of this, although it was described above that the accessory device 102 may update its configuration seed and "flags" values upon closure of the TCP and/or wireless connections in block 314, that is only one point at which the accessory device 102 may update those values; in a variation on this, the accessory device 102 may update these values instead after successfully connecting to the access point 104 at block 318.

Figure 4:
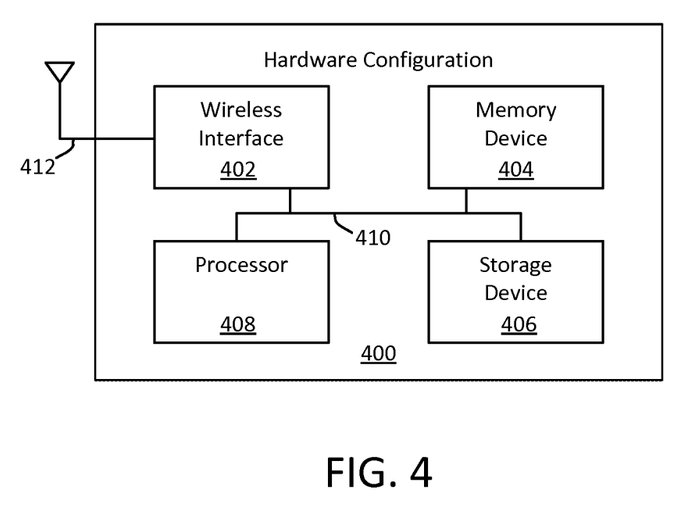
FIG. 4 shows an example hardware configuration for a wireless device that may be used to implement features described herein in accordance with some embodiments.

FIG. 4—Example Configuration of Wireless Device Hardware

FIG. 4 shows an example hardware configuration 400 that may be used to implement the controller device 100, the accessory device 102, and/or the access point 104.

As shown in FIG. 4, the hardware configuration 400 may include a wireless interface 402, memory device 404, storage memory 406, and processor 408, which are connected via system bus 410. The hardware configuration 400 may also include an antenna 412, coupled to the wireless interface 402.

The processor 408 may be a component such as an integrated circuit that may include logic circuitry configured to perform data processing and related actions. The processor 408 may be or include, for example, a single- or multi-core processor, a digital signal processor (DSP), a plurality of microprocessors, one or more microprocessors in association with a DSP core, a controller or microcontroller, one or more Application Specific Integrated Circuits (ASICs), one or more Field Programmable Gate Array (FPGA) circuits, an application processor (AP), or a system-on-a-chip (SOC). Alternatively or additionally, the processor 408 may be configured to use an instruction set architecture such as x86, ARM, and/or any other instruction set architecture.

The memory device 404 may be or include a device such as a RAM (such as a D-RAM or S-RAM), or other type of memory device. The data storage device 406 may be or include a hard disk, a flash memory, a magneto-optical medium, an optical medium, or other type of data storage device.

The wireless interface 402 may be or include one or more integrated circuits (or portion of thereof) or other type of circuit (or portion of thereof), or other type of component for implementing wireless communications and related functionality. The wireless interface 402 may include: a memory module; a processor and/or specific-purpose DSP circuitry for implementing functionality such as but not limited to baseband signal processing, physical layer processing, data link layer processing, and/or other functionality; one or more digital to analog converters (DACs) for converting digital data to analog signals; one or more analog to digital converters (ADCs) for converting analog signals to digital data; and radio frequency (RF) circuitry (e.g., one or more amplifiers, mixers, filters, phase lock loops (PLLs), and/or oscillators); and/or other components. The wireless interface 402 may communicate using Wi-Fi technology, and/or any other wireless technology.

As mentioned above, the wireless interface 402 may be coupled to the antenna 412 in the hardware configuration 400. It should be understood that, whenever it is described in this document that the wireless data is transmitted using the hardware configuration 400, the transmitting may include the wireless interface 402 providing one or more signals to the antenna 412, which may then be transmitted by the antenna 412 as radio frequency (RF) or other electromagnetic (EM) signals; similarly, whenever it is described in this document that the wireless data is received using the hardware configuration 400, the receiving may include the antenna 412 receiving RF (or other EM) signals, and providing the signals to the wireless interface 402 for processing.

Although not shown in FIG. 4, the hardware configuration 400 may be connected to a display device (such as a liquid crystal display (LCD) monitor, light emitting diode (LED) monitor, or organic light emitting diode (OLED) monitor) and/or include a display device (such a touchscreen based on LCD or LED/OLED technology). In such an instance the hardware configuration 400 may include additional components (such as but not limited to a Graphics Processing Unit (GPU)) that may be connected to the system bus 410 and which may play a role in the display of data via the connected/included display device(s).

Alternatively or additionally, the hardware configuration 400 may be connected to and/or include an input device, such as a keyboard, mouse, touchpad, touchscreen, or motion sensor device; when it is described herein that user input is received by the hardware configuration 400, it may be performed via a connected/included input device. Alternatively or additionally, the hardware configuration 400 may also include and/or be connected to any number of other components not shown in FIG. 4, including but not limited to one or more additional wireless interfaces, interfaces for wired (e.g., Ethernet) communications, and/or components for other functionality.

In an instance where the hardware configuration 400 is used to implement the controller device 100, the memory device 404 and/or the data storage device 406 may store instructions which, when executed by the processor 408, cause the processor 408 to perform (in conjunction, as appropriate, with the wireless interface 402, memory device 404, data storage device 406, a display device, and/or an input device) any feature or any combination of features described in this document (including but not limited to with reference to FIG. 1 through FIG. 3B) as performed by the controller device 100. Alternatively or additionally, each or any of the different types of data described in this document (including but not limited to with reference to FIG. 1 through FIG. 3B) as generated and/or processed by the controller device 100 may be processed/generated by the processor 408 and may be stored in the memory device 404 and/or data storage device 406. Alternatively or additionally, the wireless communications (and related actions) described in this document (including but not limited to with reference to FIG. 1 through FIG. 3B) as performed by the controller device 100 may be performed using the wireless interface 402 (in conjunction with, as appropriate, the processor 408, memory device 404, data storage device 406, and/or antenna 412).

In an instance where the hardware configuration 400 is used to implement the accessory device 102, the hardware configuration 400 may also include and/or be connected to other components related to the functionality of the accessory device 102. For example, in an instance where accessory device 102 is a wireless speaker, the hardware configuration 400 may also be connected to components such as a speaker enclosure, a crossover network, and one or more drivers (e.g., woofers, tweeters, and/or mid-range drivers). Alternatively or additionally, the hardware configuration 400 may include an authentication co-processor. In an instance where the hardware configuration 400 is used to implement the accessory device 102, the memory device 404 and/or the data storage device 406 may store instructions which, when executed by the processor 408, cause the processor 408 to perform (in conjunction, as appropriate, with the wireless interface 402, memory device 404, data storage device 406, a display device, an authentication co-processor, and/or other components related to the functionality of the accessory device 102) any feature or any combination of features described in this document (including but not limited to with reference to FIG. 1 through FIG. 3B) as performed by the accessory device 102. Alternatively or additionally, each or any of the different types of data described in this document (including but not limited to with reference to FIG. 1 through FIG. 3B) as generated and/or processed by the accessory device 102 may be processed/generated by the processor 408 and may be stored in the memory device 404 and/or data storage device 406. Alternatively or additionally, the wireless communications (and related actions) described in this document (including but not limited to with reference to FIG. 1 through FIG. 3B) as performed by the accessory device 102 may be performed using the wireless interface 402 (in conjunction with, as appropriate, the processor 408, memory device 404, data storage device 406, and/or antenna 412).

In an instance where the hardware configuration 400 is used to implement the access point 104, the memory device 404 and/or the data storage device 406 may store instructions which, when executed by the processor 408, cause the processor 408 to perform (in conjunction, as appropriate, with the wireless interface 402, memory device 404, data storage device 406, a display device, and/or an input device) any feature or any combination of features described in this document (including but not limited to with reference to FIG. 1 through FIG. 3B) as performed by the access point 104. Alternatively or additionally, each or any of the different types of data described in this document (including but not limited to with reference to FIG. 1 through FIG. 3B) as generated and/or processed by the access point 104 may be processed/generated by the processor 408 and may be stored in the memory device 404 and/or data storage device 406. Alternatively or additionally, the wireless communications (and related actions) described in this document (including but not limited to with reference to FIG. 1 through FIG. 3B) as performed by the access point 104 may be performed using the wireless interface 402 (in conjunction with, as appropriate, the processor 408, memory device 404, data storage device 406, and/or antenna 412).

Although the wireless interface 402, memory device 404, and so on are shown as singular components, in various implementations, the hardware configuration 400 may include any number of instances of the different components 402, 404, 406, 408. Further, it should be understood that the hardware configuration 400 shown in FIG. 4 is only one example, and that the controller device 100, accessory device 102, and/or access point 104 may be implemented using any appropriate hardware configuration capable of performing the actions described herein as performed by the controller device 100, accessory device 102, and/or access point 104, respectively.

Further Applications of Described Concepts

Although examples are provided in this document that relate to Wi-Fi wireless technology, it should be understood that the features described herein may also be used, mutatis mutandis, with any other wireless technology (or combination of wireless technologies), including but not limited to one or more of: Bluetooth (including Bluetooth Classic, Bluetooth Low Energy, and/or other Bluetooth technologies); WirelessHDTV (WiDi); Wireless Home Digital Interface; Wireless HDMI; IEEE 802.11ad (WiGig); GSM/EDGE; UMTS (FDD or TDD); CDMA2000; LTE; LTE-A; and/or other wireless technologies.

Although examples are provided herein with reference to technologies such as Bonjour, DNS, DNS-SD, mDNS, and DNS-LLQ, the features described herein are also applicable, mutatis mutandis, to any technology that may be used for service discovery and/or similar functionality. For example, the features described herein may used with technologies such as Universal Plug and Play (UPnP)/Simple Service Discovery Protocol (SSDP), Service Location Protocol (SLP), Jini/River, Lightweight Directory Access Protocol (LDAP), and/or other technologies. Alternatively or additionally, although specific example message formats are described herein (i.e., particular DNS-SD/mDNS messages that include particular resource records, and so on), these message formats should be understood as being illustrative, and any other messages that include identical, similar, or analogous data (whether formatted according to DNS/DNS-SD/mDNS technology and/or other technologies such as but not limited to SSDP, SLP, or LDAP) may, mutatis mutandis, also be used.

Although features and elements are described herein in particular combinations, each feature or element can be used alone or in any combination with or without the other features and elements. For example, each feature or element as described above with reference to FIG. 1 through FIG. 4 may be used alone without the other features and elements or in various combinations with or without other features and elements. Sub-elements of the methods and features described above with reference to FIG. 1 through FIG. 4 may be performed in any arbitrary order (including concurrently), in any combination or sub-combination.

Glossary of Terms

The following terms are used in this document:

Wi-Fi: As used herein, the term "Wi-Fi" refers to wireless technologies such as but not limited to Institute of Institute of Electrical and Electronics Engineers (IEEE) 802.11 technologies, such as but not limited to IEEE 802.11a, 802.11b, 802.11g, 802.11n, 802.11ac, 802.11-2012, and/or other IEEE 802.11x technologies.

Non-transitory computer-readable medium: A device for data storage, such as a hard disk, an optical medium (such as a CD-ROM, a DVD, or a BluRay disc), a magneto-optical medium, a memory device (such as a Dynamic Random Access Memory (D-RAM), Static RAM (S-RAM), or other type of Random Access Memory (RAM)), a register, a cache memory, a Read Only Memory (ROM), a flash memory (based on, e.g., Electrically Erasable Programmable Read Only Memory (EEPROM) flash memory technology or "Negated AND or NOT AND" (NAND) flash memory technology), or other type of non-transitory device for electronic data storage. The memory device 404 and the data storage device 406 of FIG. 4 are two examples of non-transitory computer-readable media. A non-transitory computer-readable medium is distinguishable from a transitory computer-readable medium, such as a transitory signal.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for configuring a second wireless device by a first wireless device, the method comprising:

by the first wireless device:
receiving first information, including a beacon message, from the second wireless device via a first wireless network, wherein the beacon message includes a first identifier of the second wireless device and a configuration state of the second wireless device;
determining that the second wireless device is in a configurable state based on the beacon message;
receiving from the second wireless device a first configuration counter value via the first wireless network;
communicating configuration information to the second wireless device via the first wireless network, the configuration information including credentials for connecting to a second wireless network;
connecting, subsequent to communicating the configuration information, to the second wireless network using the credentials;
transmitting a service discovery message;
receiving, in response to the service discovery message, second information from the second wireless device via the second wireless network, wherein the second information comprises a second configuration counter value; and
verifying whether configuration of the second wireless device is configured successfully based on the second information by at least comparing the first configuration counter value to the second configuration counter value, wherein configuration counter values of the second wireless device change when the configuration of the second wireless device changes.

2. The method as recited in claim 1, further comprising:
by the first wireless device:
displaying, to a user of the first wireless device, a configuration status of the second wireless device based on the first information; and
obtaining a user input indicating whether to configure the second wireless device.

3. A wireless device comprising:
a wireless interface;
a data storage device; and
a processor, coupled to the wireless interface and the data storage device and configured to execute instructions stored in the data storage device that cause the wireless device to:
receive from an accessory device a beacon message including a first identifier of the accessory device and a configuration state of the accessory device via a first wireless network;
determine that the accessory device is in a configurable state based on first information included in the beacon message;
receive from the accessory device a first configuration counter value via the first wireless network;
communicate configuration information to the accessory device, the configuration information including credentials for connection to a second wireless network;
join, subsequent to the communication of the configuration information to the accessory device, the second wireless network using the credentials;

transmit a service discovery message;
receive, in response to the service discovery message, second information from the accessory device via the second wireless network, wherein the second information comprises a second configuration counter value; and
verify whether configuration of the accessory wireless device is configured successfully based on the second information by at least comparing the first configuration counter value to the second configuration counter value, wherein configuration counter values of the accessory device change when the configuration of the accessory device changes.

4. The wireless device as recited in claim 3, wherein the first identifier comprises a medium access control (MAC) address of the accessory device.

5. The wireless device as recited in claim 3, wherein the instructions when executed by the processor further cause the wireless device to:
display, to a user of the wireless device, a configuration status of the accessory device based on the configuration state received from the accessory device; and
obtain a user input indicating whether to configure the accessory device.

6. A controller device comprising:
a wireless interface;
a memory; and
one or more processors, wherein the memory includes instructions that, when executed by a processor of the one or more processors, cause the controller device to perform operations comprising:
receiving, via the wireless interface, (i) a beacon message from an accessory device, wherein the beacon message comprises a medium access control (MAC) address identifying the accessory device, and (ii) a first configuration counter value,
determining that the accessory device is in a configurable state;
sending, via the wireless interface, a credential to the accessory device in a configuration message, wherein the credential includes an access point password for a wireless local area network access point (AP),
connecting with the AP using the credential, subsequent to sending the credential to the accessory device;
transmitting a service discovery message, and
verifying, based on information received in response to the service discovery message, whether the accessory device has been configured successfully by at least comparing the first configuration counter value to a second configuration counter value included in the information, wherein configuration counter values of the accessory device change when the configuration of the accessory device changes.

7. The controller device of claim 6, wherein the operations further comprise:
prior to the receiving the beacon message:
receiving, via a user interface, a user password input including the access point password; and
associating with the AP using the access point password.

8. The controller device of claim 7, wherein the operations further comprise:
prior to the sending the credential and after receiving the beacon message:
displaying, to a user of the controller device, a name of the accessory device or a service set identifier (SSID) of the accessory device, wherein the beacon message includes the name and the SSID; and
receiving a user direction input directing the controller device to configure the accessory device.

9. The controller device of claim 8, wherein the operations further comprise:
prior to the sending the credential and after the receiving the user direction input:
dissociating from the AP.

10. The controller device of claim 9, wherein the operations further comprise:
prior to the sending the credential and after the dissociating from the AP:
receiving a resource record from the accessory device, wherein the resource record includes a second MAC address;
determining that the second MAC address matches the MAC address identifying the accessory device; and
establishing a transmission control protocol (TCP) session with the accessory device.

11. The controller device of claim 10, wherein the operations further comprise:
prior to the sending the credential and after establishing the TCP session:
establishing an encryption scheme using asymmetric key exchange, wherein the sending the credential comprises sending the credential using the encryption scheme during the TCP session.

12. The controller device of claim 11, wherein the operations further comprise:
prior to the sending the credential and after the establishing the encryption scheme:
generating the configuration message, wherein the configuration message includes, in addition to the access point password, one or more of: i) an administrative password used to change settings of the accessory device, ii) a firmware revision of the accessory device, iii) a hardware revision of the accessory device, iv) a language identifier, v) a manufacturer identifier associated with the accessory device, vi) a model identifier of the accessory device, vii) a name value that the accessory device is to use in advertising itself, viii) a password used to access media streaming, and/or ix) a serial number of the accessory device.

13. The method of claim 1, wherein the second information further includes a medium access control (MAC) address, a hostname, and a port.

14. The method of claim 1, wherein the service discovery message is a multicast domain name system (mDNS) query message or a simple service discovery protocol (SSDP) message.

15. The method of claim 1, wherein the second information includes a resource record.

16. The method of claim 15, further comprising:
by the first wireless device, when the resource record indicates that the second wireless device has been configured:
providing a configuration success indication on a display of the first wireless device.

17. The method of claim 15, wherein the verifying further comprises:
determining that a medium access control (MAC) address read from the resource record matches the first identifier.

18. The method of claim 15, wherein the verifying further comprises:
   resolving an internet protocol (IP) address of the first wireless device using a hostname read from the resource record.

\* \* \* \* \*